United States Patent [19]

Clausen et al.

[11] 4,452,837

[45] Jun. 5, 1984

[54] WEB REINFORCED WITH STRING-TYPE ADHESIVE AND METHOD OF MANUFACTURING SAME

[75] Inventors: Victor H. Clausen, Vancouver, Wash.; Paul Kaplan, Peapack, N.J.

[73] Assignee: H. B. Fuller Company, St. Paul, Minn.

[21] Appl. No.: 260,489

[22] Filed: May 4, 1981

Related U.S. Application Data

[63] Continuation of Ser. No. 47,255, Jun. 11, 1979, abandoned.

[51] Int. Cl.³ ............................. B32B 3/28; B32B 3/02
[52] U.S. Cl. ..................................... 428/35; 156/166;
 156/210; 156/310; 156/320; 428/105; 428/112;
 428/182
[58] Field of Search ............... 428/182; 156/210, 306.6,
 156/166; 428/184, 186, 113, 105, 112; 229/55

[56] References Cited

U.S. PATENT DOCUMENTS

| | | | |
|---|---|---|---|
| 958,385 | 5/1910 | Fitzgerald | 229/55 |
| 2,076,343 | 4/1937 | Humphner | 156/177 |
| 2,772,718 | 12/1956 | Magnuson | 156/177 |
| 2,985,553 | 5/1961 | Anderson | 428/186 |
| 3,072,512 | 1/1963 | Dalle | 428/255 |

OTHER PUBLICATIONS

"Stringking System", H. B. Fuller Co., Packaging Adhesives Division, St. Paul, Minn.

Primary Examiner—Paul J. Thibodeau
Attorney, Agent, or Firm—Merchant, Gould, Smith, Edell, Welter & Schmidt

[57] ABSTRACT

A process of reinforcing a sheetlike substrate by applying a plurality of linear reinforcements comprising a filamentary core having a pre-coating of "hot melt" adhesive to the substrate with at least one of the linear reinforcements applied in a generally serpentine or waveform pattern to provide both in-machine and cross-machine tensile strength and tear resistance. The present invention is also an improved reinforced sheetlike substrate having the linear reinforcements applied thereon in accordance with the process. In one embodiment, adjacent linear reinforcements are applied in an overlapping or interlocking serpentine configuration onto the substrate. In one embodiment of the process, the sheetlike substrate is conducted along a path defined as the in-machine direction while the plurality of linear reinforcing members are fed through a guide member that is reciprocating transversely with respect to the in-machine direction. The temperature of the thermoplastic adhesive is raised above its softening point and then allowed to harden to bond the linear reinforcing members onto the substrate.

12 Claims, 5 Drawing Figures

WEB REINFORCED WITH STRING-TYPE ADHESIVE AND METHOD OF MANUFACTURING SAME

This is a continuation of application Ser. No. 047,255 filed June 11, 1979, now abandoned, which in turn is a continuation-in-part of application Ser. No. 929,191, filed July 28, 1978, and now abandoned.

BACKGROUND OF THE INVENTION

The present invention relates broadly to a method of reinforcing a sheet-like substrate to provide a substrate with improved tear resistance and tensile strength in both the in-machine and cross-machine directions. More specifically, the present invention is the process and product formed by the process of applying a plurality of linear reinforcing members comprising an essentially filamentary core pre-coated with a hardened thermoplastic adhesive to a sheetlike substrate web in a pattern wherein at least one of the linear reinforcing members has both in-machine and cross-machine directional components.

Linear reinforcements that include a filamentary core pre-coated with a thermoplastic "hot melt" adhesive are known in the prior art. The assignee of the present invention, H. B. Fuller Company, has developed and is marketing such reinforcements under the trade names LINEAR ® Adhesives and STRING KING ®. The STRING KING ® product typically has a core of glass, polyester, cotton, polypropylene or other fibers and the "hot melt" adhesive has a softening point at temperatures elevated somewhat above the ambient and generally has an ethylene-vinyl acetate/wax/tackifying resin formula of a type known in the art. These reinforcing products may be applied and have been applied by passing the linear reinforcing members onto a continuous web and heating the "hot melt" adhesive above its softening point. A plurality of parallel lines of reinforcements has been applied between a linear and a fluted web in the manufacture of reinforced corrugated board. The pre-coated adhesive is then elevated above its softening point and allowed subsequently to harden. The linear reinforcements thus applied provide significant tensile strength in what can be defined as the in-machine direction of the moving web and tear resistance at angles to the in-machine direction. However, such linear reinforcements provide little or no tensile strength in the transverse or cross-machine direction and/or tear resistance in the in-machine direction.

It is also known in the prior art to reinforce a laminated structure by incorporating string or thread-like reinforcement between the laminations to provide cross-machine and in-machine strength. Such methods include relatively complex systems for the application of an adhesive to bond the laminations independently of the string reinforcements. In the known processes, the string reinforcements are drawn through a liquid bath of adhesive and then allowed to harden bonding the laminations with the string or thread-like reinforcements therebetween.

The present invention is a method substantially less complex, more flexible, and more economical than the prior art processes for providing in-machine and cross-machine reinforcements to a sheet-like substrate and/or lamination. The process of the present invention utilizes the advantages of reinforcements pre-coated with "hot melt" type adhesives which have rapid setting features.

An infinite number of reinforcement patterns can be applied to the sheet-like substrate in the method of the present invention.

Utilizing the method of the present invention, an improved reinforced sheet-like substrate, and in particular an improved paper substrate, can be manufactured having the linear reinforcements and pre-coated "hot melt" adhesive applied to the surface thereof in a generally serpentine pattern achieving substantial tear resistance and tensile strength in the in-machine and cross-machine directions to eliminate the need for multi-ply bags. Additionally, the reinforcement applied in the method of the present invention may lead to the use of lower basis weight or less costly paper on single ply bags and the production of bags with sufficient strength to package wet products without the need for wet strength paper.

SUMMARY OF THE INVENTION

The present invention is a process for forming a reinforced sheetlike substrate that includes the step of conducting the sheetlike substrate along a path defined as the in-machine direction. A plurality of linear reinforcing members coated with hardened thermoplastic adhesive core applied to a surface of the substrate with at least one of the reinforcing members aligned in a generally serpentine pattern such that the reinforcing member has a directional component generally transverse to the in-machine direction and a directional component generally aligned with the in-machine direction. The temperature of the thermoplastic adhesive is raised above its softening point and then allowed to harden to bond the reinforcing members to the substrate. In one embodiment of the present invention, the plurality of linear reinforcing members are fed through a guide member onto a sheetlike substrate. To achieve the generally serpentine or waveform pattern, the guide member is reciprocated in a direction transverse to the in-machine direction. In another embodiment of the method of the present invention, the plurality of reinforcing members are applied to the surface of the substrate in an overlapping or interlocking generally serpentine pattern. To achieve this pattern, a second guide member may be provided through which a second set of reinforcing members are directed onto the surface of the sheetlike substrate. The first and second guide members are reciprocated transversely to the in-machine direction and out of phase with each other.

The step of raising the temperature of the hardened thermoplastic adhesive above its softening point may occur either prior to, subsequent to, or as the plurality of linear reinforcing members are applied to the surface of the sheetlike substrate. In one embodiment, the temperature is raised as the reinforcing members are being applied by disposing a heated roll in the path of the substrate and allowing the substrate to wrap about a portion of the circumference of the heated roll. The linear reinforcing members are directed onto the substrate proximate the point where the substrate first contacts the roll and are captured between the substrate and the roll to maintain the serpentine pattern while the thermoplastic adhesive is activated. In the embodiment of the method of the present invention wherein thermoplastic adhesive is activated prior to application of the linear reinforcing members onto the surface of the substrate, the reinforcing members are guided through a hot air tube in which air heated to temperatures sufficient to activate the thermoplastic adhesive is introduced.

The present invention also includes a reinforced sheetlike substrate having a sheetlike base member with a plurality of linear reinforcing members pre-coated with hardened thermoplastic adhesive applied thereto in a generally serpentine or waveform pattern. The pre-coating of thermoplastic adhesive is raised to the temperature above its softening point and allowed to harden on the surface of the sheetlike base member. More specifically, the present invention also includes a reinforced sheetlike substrate as described above wherein the sheetlike base member is a single ply paper substrate. The present invention also includes a paper bag manufactured of the reinforced paper substrate.

The present invention can be used to reinforce a single sheetlike substrate or to provide reinforcement for laminations, such as corrugated board. In one embodiment, the present invention is a process for forming a reinforced lamination which includes the steps of conducting first and second sheetlike substrates along a path defined as the in-machine direction and joining the first and second sheetlike substrates together. The plurality of linear reinforcing members pre-coated with hardened thermoplastic adhesive are applied between the first and second sheetlike substrates in a substantially serpentine configuration by guiding the linear reinforcing members onto the surface of the substrate through a guide member which is reciprocated in a direction transverse to the in-machine direction. The temperature of the thermoplastic adhesive is raised above its softening point and subsequently allowed to harden, bonding the linear reinforcing members to the first and second sheetlike substrates. The present invention is also a corrugated board manufactured in accordance with the lamination process thus described. Further, the present invention is an improved reinforced tote bin manufactured from the reinforced corrugated board of the present invention.

From the above description, it will be appreciated that the present invention is a process and product formed thereby in which a sheetlike substrate or lamination is reinforced by the application of linear reinforcing members pre-coated with thermoplastic adhesive onto the sheetlike substrate in a pattern to provide both in-machine and cross-machine tear resistance and tensile strength. The process of the present invention is less complex, more flexible and more economical than current prior art methods of adding string reinforcements to substrates and/or laminations. Reinforcing members can be applied by the present invention in an infinite number of patterns in accordance with the particular design requirements. Additionally, the products manufactured in accordance with the process of the present invention have significantly improved strength characteristics which in the case of paper bags substantially eliminates the necessity of multi-ply bags resulting in cost reduction of paper bag manufacture. The method of reinforcement is applicable to any number of sheetlike substrates or webs and laminates, including fabrics (both woven and nonwoven), plastic film, felted materials, foil, etc., particularly kraft paper, materials used in corrugated board, and other waterlaid and airlaid paperlike and nonwoven materials. The advantage of the present invention will become more apparent with reference to the accompanying drawings, detail description of preferred embodiments, and claims.

Detailed Description of the Preferred Embodiment

Figure 1:
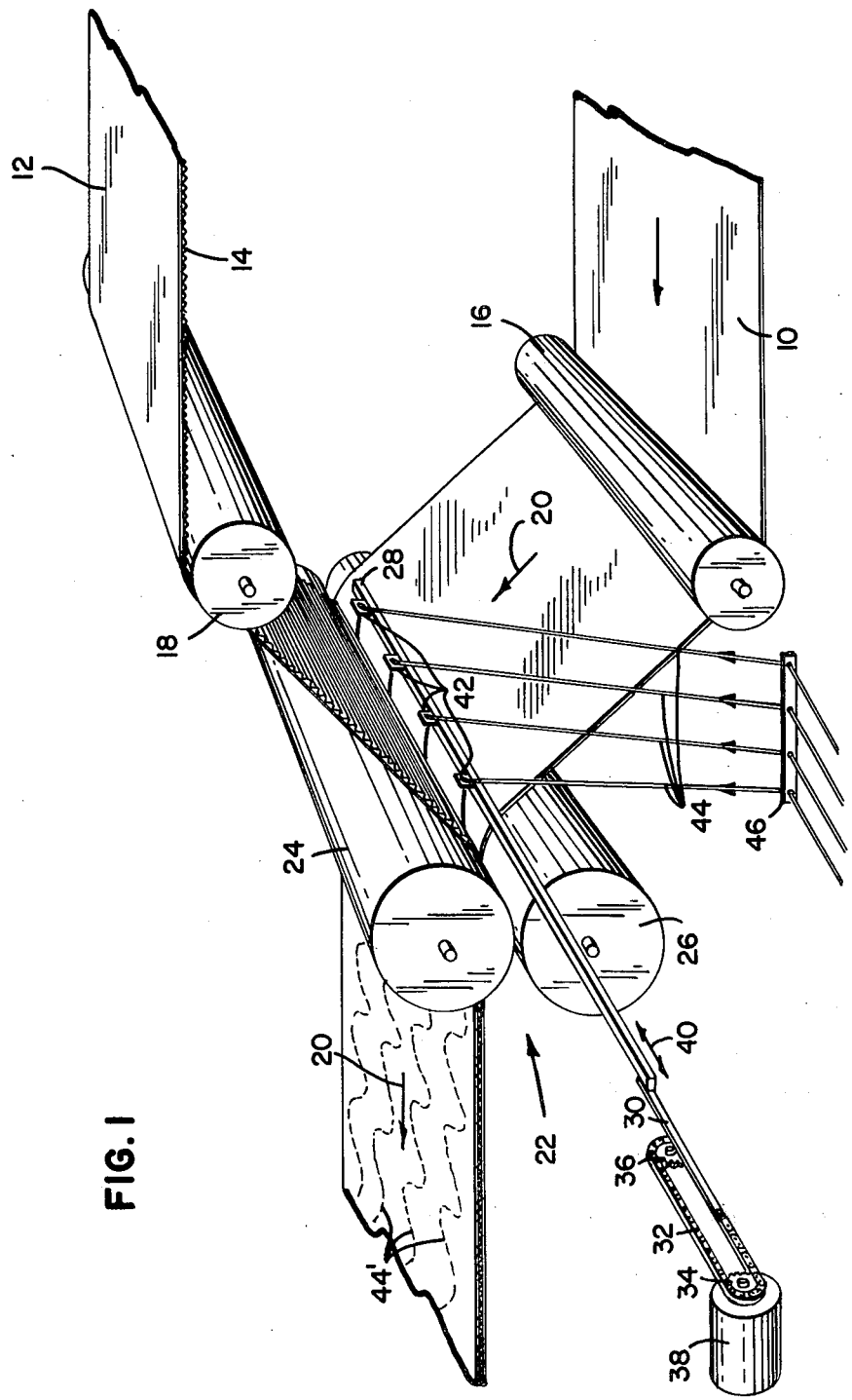
FIG. 1 is a view in perspective illustrating a method of reinforcing corrugated board in accordance with the present invention.

Referring to the Drawings, FIG. 1 illustrates the method of the present invention as applied in the manufacture of corrugated board. A liner 10 and a single face web 12 having flutes 14 on one side thereof are conducted about rolls 16 and 18 in a direction which can be defined as the in-machine direction illustrated by arrow 20. Liner 10 and web 12 are joined at double backer 22 which includes a pair of cooperating rolls 24 and 26 that are mounted for rotation about horizontal axes which extend transversely with respect to the in-machine direction across the entire width of liner 10 and web 12. Disposed proximate double backer 22 and in close proximity to the point where liner 10 and web 12 are joined together in an elongated guide bar 28. Guide bar 28 has an elongation axis oriented generally transverse or orthongonal with respect to in-machine direction 20. Pivotally mounted to one end of guide bar 28 is a connecting rod 30. Connecting rod 30 is itself attached to a chain drive 32. Chain drive 32 is wrapped about a pair of pulleys 34 and 36, one of which is driven by a suitable motor 38. The connections of rod 32, guide bar 28 and chain drive 32 may be by any convenient prior art means. As chain drive 32 is driven by motor 38 connecting rod 30 and therefore, guide bar 28 reciprocates transversely or in the cross-machine direction as shown by double headed arrow 40.

A plurality of guide eyelets 42 may be affixed to and spaced apart along guide bar 28. A plurality of linear continuous reinforcements 44 pre-coated with a hardened thermoplastic adhesive are threaded through a stationary guide bar 46 and eyelets 42 from a conventional prior art dispensing apparatus (not shown). Reinforcements 44 are string-like members that may include a core of glass, polyester, cotton, nylon, polypropylene or other fibers which are coated with a thermoplastic adhesive commonly referred to as "hot melt" adhesive. Hot melt adhesives are harden heat stable materials at normal temperatures which soften to an adhesive consistency at temperatures adhesives are well known in the prior art. A typical hot melt adhesive continuous reinforcement may be a 1000 denier polyester core coated with a thermoplastic adhesive selected to have a softening point of 150° F. (65° C.) and a relatively high viscosity at that temperature. As noted previously, the preferred type of reinforcing member is the STRING KING ® product which comprises a fibrous core coated with a hot melt adhesive of the aforementioned type of formula. The formula for the adhesive varies for each application of the technology, and no single formula would be suitable for all uses. A typical preferred formula contains about 25 to 50 weight-% ethylene-vinyl acetate copolymer (e.g. "ELVAX", trademark of the duPont Company), about 10 to about 30 weight-% of a wax having a melting point ranging from about 65° to about 110° C., and about 30 to about 50 weight-% of a tackifying resin of the so-called "hydrocarbon resin" type (e.g. a coal- or petroleum-derived resin or a synthetic terpene resin or a polyvinyl arene resin such as polystyrene). The ingredients and proportions can vary for each STRING KING® product in a manner known in the art and is dependent in part upon the conditions of use (e.g. the amount of heat available), the nature of the substrate, etc. For example, for manufacture of corrugated board, various formulas are suitable, but relatively low melting point wax is preferred, and the other ingredients are preferably selected for high viscosity, adequate tack, and a softening point of about 65° C.

Reinforcements 44 are directed from eyelets 42 between liner 10 and web 12 at double backer 22. As guide bar 28 reciprocates transversely reinforcements 44 are applied between liner 10 and web 12 in a generally serpentine pattern as shown by the lines at 44'. A serpentine pattern or configuration for the purposes herein can be described generally as a pattern in which reinforcement 44 has a directional component in the in-machine direction 20 and a directional component transverse to the in-machine direction, in other words, in the cross-machine direction. Alternatively, the pattern can be described as one in which the reinforcements alternatively lie on opposite sides of a straight line drawn parallel to the in-machine direction 20. The specific pattern of the reinforcements may depend upon the speed of liner 10 and web 12, the relative distance of the axial reciprocation of the guide bar 28, the spacing of the guide bar 28 from the double backer 22, the guide reciprocating speed, and the diameter the pulleys 34 and 36.

Downstream of double backer 22 in the corrugating machine, heat provided by platens (not shown) and a traveling belt (not shown) which is used to cure the starch based adhesive used to bond flutes 14 to liner 10 serves the additional function of raising the temperature of the hardened thermal plastic adhesive coating reinforcements 44 above the softening point. Following heating the corrugated product is directed through a cooling station in which the temperature is lowered below the softening point of the hot melt adhesive so that reinforcements 44 are bonded securely between liner 10 and single face web 12 before the corrugated board is cut to specific lengths.

Figure 2:
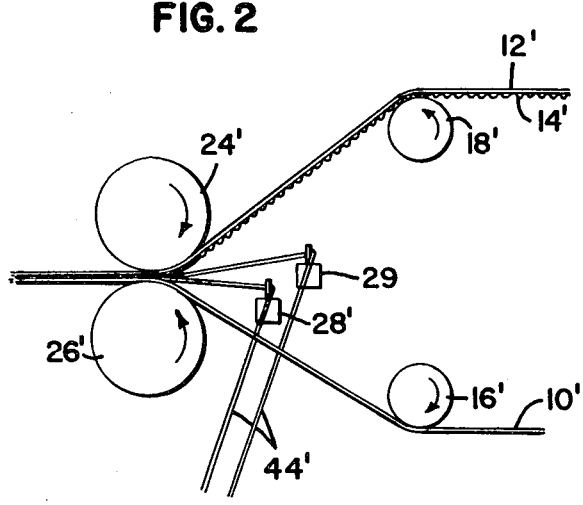
FIG. 2 is a diagramatic representation of an alternative method of reinforcing corrugated board in accordance with the present invention.
Figure 5:
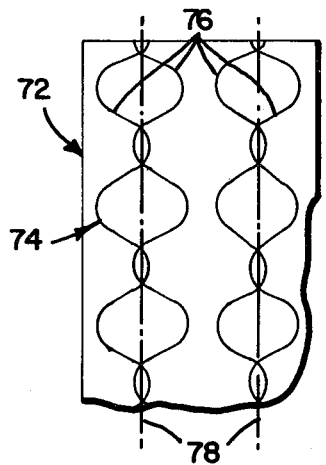
FIG. 5 illustrates an improved sheetlike substrate of the present invention having an interlocking and overlapping generally serpentine pattern of linear reinforcements applied thereto.

Significant greater strength and tear resistant characteristics can be achieved on a sheetlike substrate by providing a pattern of reinforcements 44 wherein adjacent reinforcements overlap and interlock with each other as shown in FIG. 5. FIG. 2 illustrates diagrammatically a method for applying reinforcements 44' in an interlocking pattern. A pair of guide bars 28' and 29 which are substantially identical to guide bar 28 are similarly disposed transversely with respect to in-machine direction 20'. For the sake of clarity, only one reinforcement 44' is shown associated with each guide bar 28' and 29. However, it is understood that a plurality of reinforcements 44' may be threaded through eyelets on each guide bar 28' and 29 prior to introduction of reinforcements 44' between liner 10' and web 12' at double backer nip 22'. To achieve an interlocking or overlapping pattern, guide bars 28' and 29 are reciprocated transversely out of phase with respect to each other. For example, in a preferred embodiment of the method of the present invention guide bars 28' and 29 are reciprocated 180° out of phase with each other. It would be understood that guide bars 28' and 29 are mounted in close proximity to double backer nip 22' and oriented such that reinforcements 44' feeding through each guide bar do not become entangled with reinforcements feeding through the other guide bar. The location of guide bars 28' and 29 to eliminate any entanglement problems is considered to be within the knowledge of one having ordinary skill in the art. Each guide bar 28' and 29 is provided with suitable means for transverse reciprocation thereof as described in more detail with respect to FIG. 1. The drive means can include suitable control for regulating the pattern of reinforcements 44' applied between liner 10' and web 12'.

Figure 3:
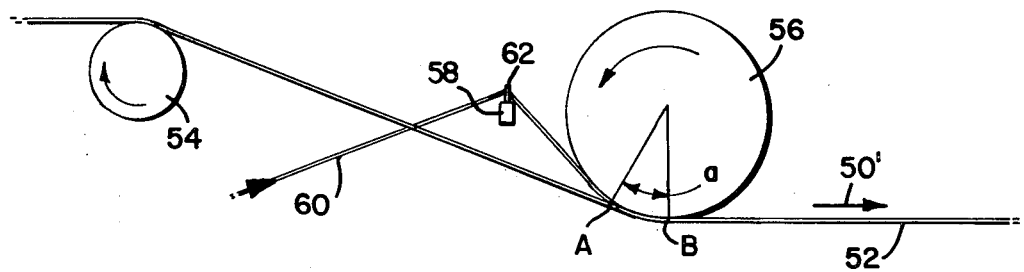
FIG. 3 is a diagramatic representation illustrating a method of reinforcing a sheetlike substrate in accordance with the present invention.
Figure 4:
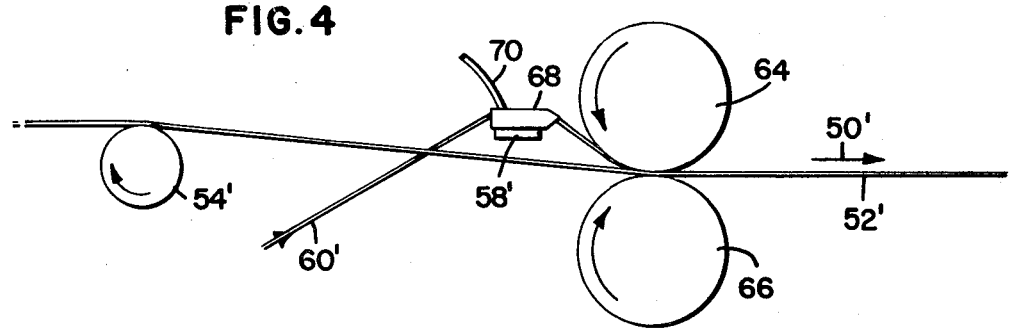
FIG. 4 is a diagramatic representation illustrating an alternative method of reinforcing a sheetlike substrate in accordance with the present invention.

FIGS. 3 and 4 illustrate diagrammatically alternative methods of the present invention specifically wherein reinforcements having a pre-coated hot melt adhesive are applied to only one side of a sheetlike substrate. In the embodiments shown in FIGS. 3 and 4, the sheetlike substrate is a continuous web moving in the direction indicated by arrows 50 and 50'. A web 52, as shown in FIG. 3, travels over a roll 54 mounted for rotation about an axis generally transverse or orthogonal with respect to the in-machine direction 50. A heated roll 56 is also disposed in the path of web 52. Roll 54 and heated roll 56 are oriented with respect to each other so that web 52 contacts roll 56 for portion of its circumference denoted by angle a and separates from the surface of heated roll 56 at point B. At least one guide bar 58 is disposed transversely across web 52 for reciprocation as previously described. A plurality of reinforcements pre-coated with hot melt adhesive, one of which is illustrated at 60, are threaded through eyelets 62 on guide bar 58 and fed onto web 52 as close as possible to the point A. Reinforcements 60 are thereby captured and held in place between web 52 and heated roll 56 from point A to point B. Heat from roll 56 serves to activate the "hot melt" adhesive pre-coated on reinforcements 60 and raise the temperature thereof above the softening point. The thermoplastic adhesive subsequently is allowed to harden whereby reinforcements 60 are firmly bonded to surface of web 52. Guide bar 58 may reciprocate transversely with respect to web 52 to generate a serpentine pattern of reinforcements 60 on web 52. It is also understood that an additional guide bar can be provided to feed another set of reinforcements 60 onto web 52 and that the two guide bars may be made to reciprocate out of phase to generate an interlocking pattern, or any other pattern as desired.

In the method illustrated in FIG. 3, it will be understood that reinforcements 60 are held in place in the desired pattern between web 52 and roll 56 while the roll 56 activates the hot melt adhesive. The time that the reinforcements 60 are in contact with the heated roll may be referred to as "dwell time". Dwell time is a function of the diameter of the heated roll, the speed of the heated roll in revolutions per minute and the percentage of the total circumference of the heated roll which is in contact with the reinforcements. Specifically, the characteristics of the reinforcements 60, the heated roll 56 and a relative position of points A and B may be varied in accordance with specific design criteria. It can be understood that it is necessary to balance the characteristics of the hot melt adhesive, the mass of the reinforcements are coated adhesive with the temperature of the roll and the dwell time of the reinforcements on the roll. For example, the nature of the specific reinforcement and hot melt adhesive may dictate the desired combination of roll temperature and dwell time. Alternatively, with dwell time fixed at a constant, suitable combination of roll temperature and string, characteristics must be selected to achieve an operative system.

Additionally, the quality of the bond between reinforcements 60 and web 52 is in part a function of the pressure between roll 56 and web 52. Various methods of regulating the pressure are available to include a spring means or hydraulic or air cylinder means. Such methods of pressure control are within the capabilities of one having ordinary skill in the art. Also, increasing the tension on web 52 increases the pressure of web 52 against roll 56 and, therefore, this increased pressure will improve the degree of hot melt adhesive peentration and the strength of the bond between web 52 and reinforcements 60.

Whereas, in the method shown in FIG. 3, the hot melt adhesive coated on reinforcement 60 is activated as reinforcements are being applied to the web 52, in the method illustrated in FIG. 4, the hot melt adhesive is activated or raised above its softening point just prior to its introduction on to the surface of the substrate. More specifically, a substrate which is disclosed as a continuous web 52' traveling in an in-machine direction 50' passes over a roll 54' and between cooperating rolls 64 and 66. String-like reinforcements 60' are fed from a dispensing apparatus (not shown) through an activating tube 68 mounted on a guide bar 58'. It will be understood that a plurality of string-like reinforcements 60' and associated activating tubes 68 can be provided, however, for the sake of clarity, only one such reinforcement and tube are illustrated in FIG. 4. Guide bar 58' is disposed so that reinforcement 60' which exits from activating tubes 68 is applied onto the surface of web 52' as close as possible to the point where web 52' passes between cooperating rolls 64 and 66. Activating tube 68 may take a form of a number of devices. In the embodiment illustrated in FIG. 4, activating tube 68 is simply a hollow tube through which reinforcements 60' are fed and into which heated compressed air is blown from a tube 70 connected to a heated compressed air source (not shown). The hot air blown into tube 68 raises the temperature of the hot melt adhesive precoated on reinforcements 60 above its softening point activating the adhesive prior to application of reinforcements 60' onto the surface of web 52'. Guide bar 58' is again mounted for transverse reciprocation with respect to the in-machine direction 50'. It is also understood that a second guide bar with activating tubes 68 thereon may be provided and the guide bars programmed to generate a desired pattern of reinforcements on web 52'. As previously mentioned, activating tube 68 may be any structure equivalent to the specifically disclosed which serves the function of activating the hot melt adhesive as the reinforcements travel through the tube and prior to application of the reinforcements on web 52'. Cooperating rolls 64 and 66 combine to apply pressure to reinforcements 60' against web 52' to insure an adequate bond between reinforcements 60' and web 52'. One of rolls 64, for example, may be rigidly mounted for rotation about an axis transverse to web 52' while the other of rolls 64 and 66 may be vertically adjustable to and away from the fixed roll to regulate the pressure on the web 52' at the point where web 52' passes between the rolls 64 and 66. The means of regulating the pressure can be by spring means or hydraulic or air cylinder as described with respect to the FIG. 3. Additionally, pressure regulation can be achieved by allowing web 52' to wrap about a small portion of the circumference of roll 64 similar to the method illustrated in FIG. 3. For example, web 52' could initially contact roll 64 at some point about its circumference prior to the point where the rolls 64 and 66 nip web 52 therebetween. This method of allowing the web 52 to wrap about a portion of the circumference of rolls 64 could generate required pressure to insure adequate bond between reinforcements 60' and web 52'.

In the discussion above, the method of the present invention has been described with respect to reinforcing corrugated board and a single sheet or continuous web substrate. It should be understood, however, that the present invention is equally applicable to the reinforcement of laminated structures in general and other sheet-like substrates. Similarly, the present invention is applicable in the reinforcement of paper products, fabrics (both woven and nonwoven), plastic films, felted materials, or any number of altnerative sheetlike substrates wherein it is desired to enhance the strength of the substrate.

FIG. 5 is illustrative of an improved sheetlike substrate manufactured in accordance with the method of the present invention. A substrate 72 has applied thereon a pattern designated generally at 74 of stringlike continuous reinforcements 76 which have previously been described as having cores of suitable material precoated with a hot melt adhesive, the temperature of which is raised above its softening point to bond reinforcements 76 to substrate 72. Pattern 74 is representative of any number of suitable alignments of reinforcements 76 which could be achieved utilizing the method of the present invention. Each reinforcement 76 can be described as being disposed alternately on opposite sides of a straight line shown for the sake of description as line 78. Line 78 is aligned in the in-machine direction as defined above. Each reinforcement 76 thus has a directional component in the in-machine direction and a directional component in the cross-machine direction or at right angles to the in-machine direction. The improved reinforced substrate 72 thereby has increased tensile strength and tear resistance in both the in-machine direction and cross-machine directions.

Pattern 74 of the hot melt coated string-like reinforcements 76 is believed to make a unique type of contribution to the tear resistance of substrate 72 by virtue of the fact that the reinforcements 76 bond to each other as well as to substrate 72 at the cross-over points in pattern 74. As shown in the Drawing, each repetition of pattern 74 (comprising one large pair and one small pair of 180°-opposed waveforms) adds two such cross-over points along line 78.

As previously mentioned, substrate 72 may be any sheetlike material. One particularly useful reinforced substrate has been found to be a single ply web of kraft paper having the reinforcements applied in a generally serpentine pattern. Paper bags manufactured of the single ply paper thus reinforced provide sufficiently strong grocery bags that eliminate the need for multiply grocery bags. Similarly, corrugated board reinforced in accordance with present invention has particular applicability in the manufacture of tote bins used by meat companies. Such tote bins have significant advantages over the prior art and improved strength and resistance to tear. These two examples are only representative of the vast number of applications of the improved and reinforced sheetlike substrates of the present invention. It should be noted that in laminated structures the hot melt adhesives may serve the dual purpose of bonding the laminations together in addition to bonding the reinforcements to the laminates.

From the above description, it can be seen that the present invention is a method of applying a linear reinforcement having a filamentary core and hot melt adhesive pre-coating to a sheetlike substrate to achieve a substrate reinforced in various directions generally defined as the in-machine and cross-machine directions. The method of the present invention is applicable to any sheetlike substrate. The present invention also includes the improved strength substrates reinforced in accordance with method described herein and the products formed by the improved reinforced substrate. It is further understood that for the sake of description, representative apparatus for carrying out the method of the present invention has been disclosed and described herein. Alternative, equivalent apparatus may also be utilized in carrying out steps of the methods disclosed and claimed to manufacture the improved sheetlike substrate of the present invention.

We claim:

1. (Twice amended) A process for forming a reinforced corrugated board comprising the steps of:
   (a) conducting a linear and a single face web having flutes on one side along a path defined as the in-machine direction;
   (b) applying in a generally serpentine pattern a plurality of linear members pre-coated with hardened thermoplastic hot melt adhesive through at least one guide member between said liner and said single face web;
   (c) joining said liner and said single face web together using a starch based adhesive in addition to the thermoplastic adhesive of the linear member;
   (d) raising the temperature of the thermoplastic adhesive and the additional adhesive above the softening point of the thermoplastic adhesive; and
   (e) allowing the thermoplastic hot melt adhesive to bond the reinforcing members between said first liner and said single face web, and allowing the additional adhesive to bond the liner to the single face web, thereby forming a reinforced corrugated board.

2. The process of claim 1 wherein step (b) the plurality of linear members precoated with hardened thermoplastic hot melt adhesive are adhered to the surface of the liner in a generally serpentine pattern, said thermoplastic adhesive being raised to a temperature above the softening point of the adhesive and subsequently allowed to harden to bond said reinforcing members to said liner, before said liner and said single faced web are joined in step (c).

3. The process of claim 2 wherein adjacent pairs of reinforcing members are applied to said sheet like base member in an interlocking serpentine pattern.

4. The process of claim 2 wherein said liner is a single ply paper web.

5. A reinforced corrugated board manufactured in accordance with the process of claim 1.

6. A reinforced tote bin manufactured from the reinforced corrugated board of claim 5.

7. The process of claim 1 wherein the temperatures of the thermoplastic adhesive and the starch based adhesive are raised by at least one platen and a traveling belt.

8. The process of claim 1 wherein in step (e) the reinforcing members, the liner and the single face web are bonded by directing the reinforced corrugated board through a cooling station allowing the thermoplastic hot melt adhesive to cool below its softening point.

9. The process of claim 8 wherein the softening point of the thermoplastic adhesive is about 65° C.

10. The process of claim 1 wherein the thermoplastic adhesive comprises about 25 to 50 weight-% ethylene-vinyl acetate copolymer, about 10 to 30 weight-% of a wax, and about 30 to 50 weight-% of a tackifying resin.

11. The process of claim 10 wsherein the wax has a melting point of about 65° C.–110° C.

12. The process of claim 10 wherein the tackifying resin comprises a tackifying hydrocarbon resin.

* * * * *

UNITED STATES PATENT AND TRADEMARK OFFICE
CERTIFICATE OF CORRECTION

PATENT NO. : 4,452,837
DATED : June 5, 1984
INVENTOR(S) : VICTOR H. CLAUSEN AND PAUL KAPLAN It is certified that error appears in the above-identified patent and that said Letters Patent are hereby corrected as shown below:

```
Column 4, line 33, for "in an" read --is an--.
Column 4, lines 34-35, for "orthongonal" read --orthogonal--.
Column 4, line 56, for "harden" read --hard--.
Column 5, lines 9-10, for "as polystyrene" read --as a
     polystyrene--.
Column 5, line 38, for "the pulleys" read --of pulleys--.
Column 7, line 1, for "are" read --and--.
Column 7, lines 19-20, for "peentration" read --penetration--.
Column 9, line 29, delete "(Twice amended)".
Column 9, line 31, for "linear" read --liner--.
Column 10, line 7, for "wherein step" read --wherein in step--.
Column 10, line 40, for "wsherein" read --wherein--.
```

Signed and Sealed this

Sixteenth Day of April 1985

[SEAL]

Attest:

DONALD J. QUIGG

Attesting Officer

Acting Commissioner of Patents and Trademarks